Nov. 23, 1943.   G. A. MOORE   2,335,192
PACKAGING PROCESS
Filed July 26, 1940   2 Sheets-Sheet 1
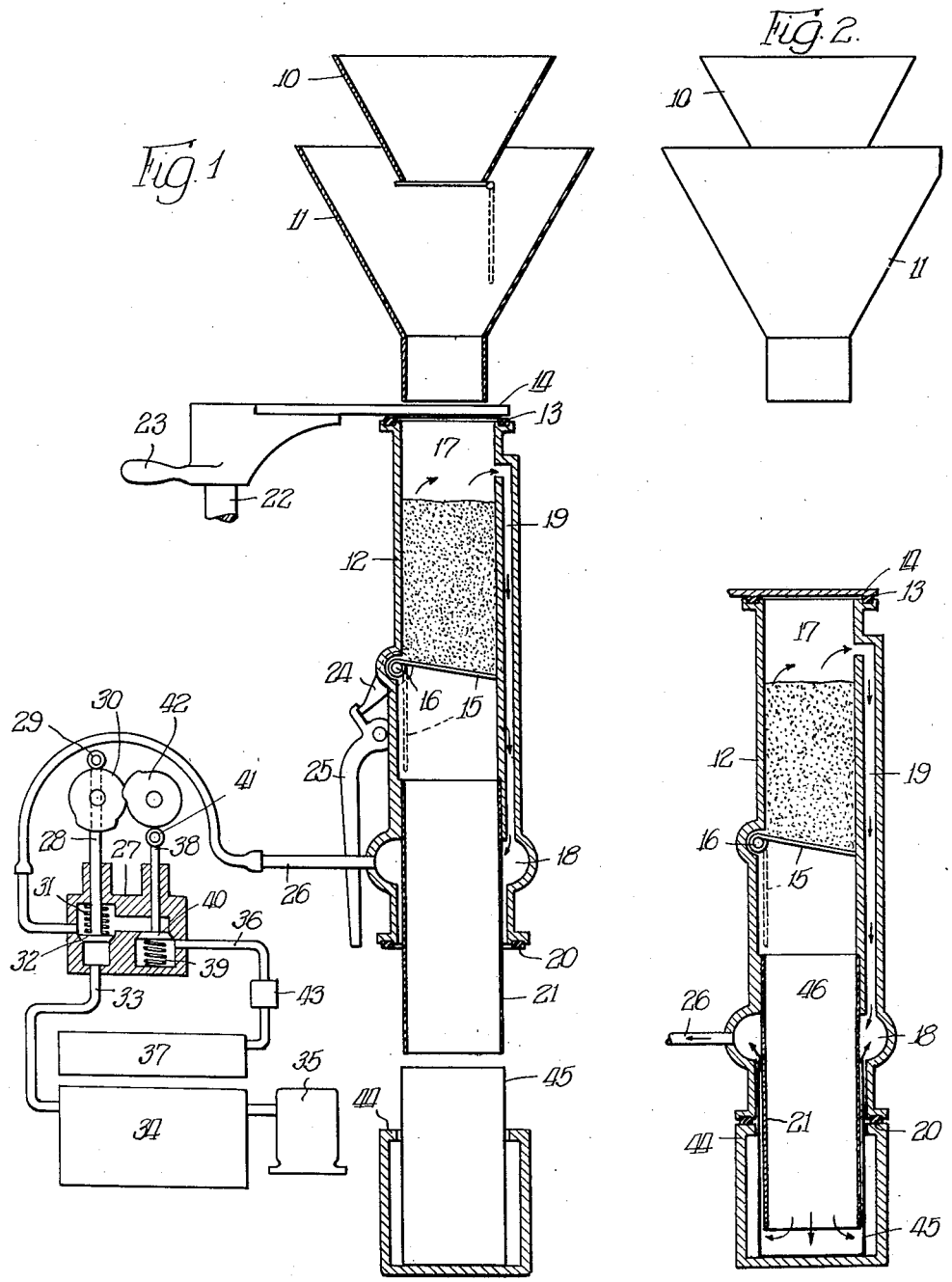
INVENTOR.
George Arlington Moore,
BY Cromwell, Greist & Warden
ATTYS.

Nov. 23, 1943.    G. A. MOORE    2,335,192
PACKAGING PROCESS
Filed July 26, 1940    2 Sheets-Sheet 2
Fig. 3.
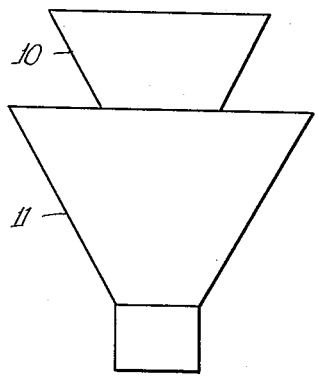
Fig. 4.
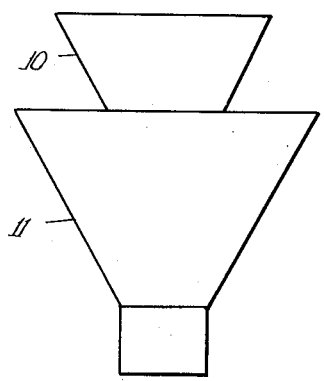
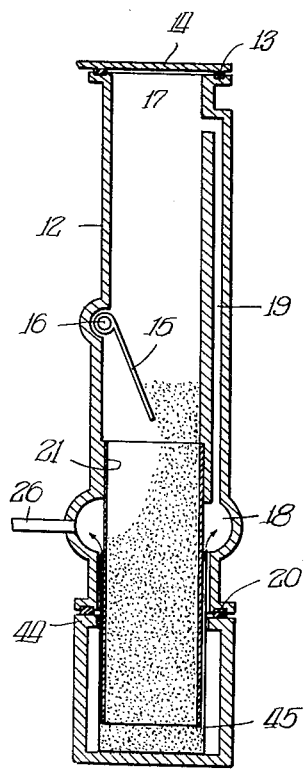
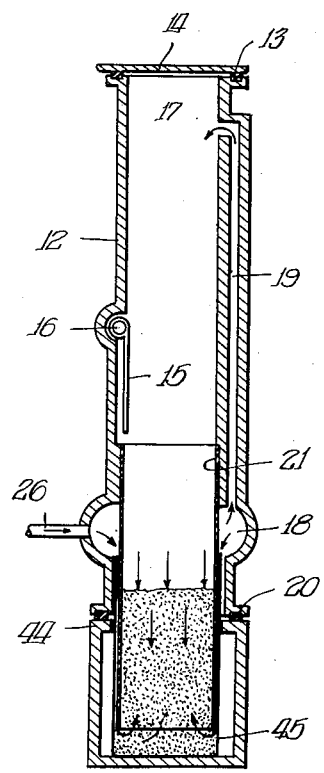
INVENTOR.
George Arlington Moore,
BY Cromwell, Greist + Warden
attys.

Patented Nov. 23, 1943

2,335,192

UNITED STATES PATENT OFFICE 2,335,192

PACKAGING PROCESS

George Arlington Moore, New York, N. Y., assignor to Shellmar Products Company, Mount Vernon, Ohio, a corporation of Delaware Application July 26, 1940, Serial No. 347,582

8 Claims. (Cl. 99—152)

The present invention relates to an improved process for the packaging of commodities such as coffee and the like, and has particular reference to the enclosure of these commodities in an hermetically sealed package by a method which involves the replacement of air by an inert gas.

It is generally known that many commodities rapidly deteriorate if exposed to the atmosphere for an appreciable period of time. The oxygen of the air exercises a deleterious action upon such commodities which may be evidenced by a pronounced change in taste or in color, or in changes of both of these characteristics. Coffee is an example of such a commodity and the present invention will be described with particular reference to the packaging of coffee, although the invention is not to be considered as limited to this particular application.

In protecting products such as coffee from the deleterious action of air, resort has been made to several different processes. One of these processes consists in packing the coffee in a container and then exhausting the air from the container and commodity. Another such method includes the displacement of the air in the container and commodity by an inert gas such as carbon dioxide. Both of these processes are effective to some extent, but each has certain disadvantages which are largely overcome by the present process.

A principal object of the present invention is the packaging of coffee and the like in an hermetically sealed package by a process which involves the unit sequential use of vacuum and an inert gas in an improved manner.

An additional object is to provide a process for packing coffee and the like by which a unit of coffee is initially placed into a primary chamber containing residual inert gas such as carbon dioxide, this residual gas is quickly exhausted as far as possible, the coffee is dumped into a secondary chamber from which residual inert gas also has been exhausted as far as possible, and additional inert gas is introduced into both chambers and the commodity.

Still another object of the invention is the packaging of coffee by maintaining the coffee in a secondary chamber within but spaced from the walls of the container and under a state of vacuum, and then passing an inert gas such as carbon dioxide into the bottom of the chamber and upwardly through the coffee held therein, the inert gas being introduced along the interior surface of the container.

A further object of the invention is the packaging of coffee by a process which involves initially dropping the coffee into a primary chamber containing residual carbon dioxide to displace a substantial percentage of the air with which the coffee is initially combined, then exhausting air and residual carbon dioxide from the coffee, then dropping the coffee into a secondary vacuum compartment, and finally injecting additional $CO_2$ into the coffee, the process thus involving the consecutive steps of displacement, exhaustion and injection.

These and other objects will be observed upon a consideration of the following description of a preferred embodiment of the invention and by reference to the accompanying drawings, in which Fig. 1 is a diagrammatic sectional view showing apparatus suitable for carrying out the invention and illustrating an initial step in the process;

Fig. 2 is similar to Fig. 1 and shows a secondary step in the operation of the process;

Fig. 3 is similar to Fig. 2 and shows a further intermediate step in the operation of the process; and Fig. 4 is a view similar to Fig. 3 showing a final stage in the operation of the process.

Hermetically sealed containers for packaging materials such as coffee may be composed of various materials. Metallic cans have met with considerable favor in the vacuum packaging of coffee, as have glass containers. These structures are sufficiently rigid to withstand the differential pressure between the interior and exterior of the container without collapsing or bulging to a noticeable extent. Coffee when freshly roasted and packed into a container evolves a certain amount of carbon dioxide. Thus, when a container initially is packed under vacuum, the evolution of carbon dioxide by the coffee may change the pressure within the container from subatmospheric to superatmospheric. A number of efforts have been made to utilize flexible containers in the packing of coffee, and although such containers are desirable the methods used heretofore in the packaging of coffee have not been particularly satisfactory. The present process may be utilized to advantage with flexible or rigid containers.

A flexible container suitable for packaging coffee consists of a bag-like construction composed of an outer layer of paper laminated to an inner layer of transparent rubber hydrochloride which is hermetically sealed to itself to provide a relatively gas-proof construction. In the operation of the process as illustrated in the drawings a unit quantity of coffee is dumped from the loading scale 10 into the hopper-like funnel 11.

Directly below the funnel 11 is a vertically reciprocable loading tube 12. The top of the tube 12 is provided with a gasket 13 which seats a horizontally reciprocable valve plate 14 to intermittently hermetically seal the top of the loading tube.

At an intermediate point within the interior of the loading tube 12 is mounted a gate 15 which is pivoted as shown at 16 to move from the open position shown in dotted lines to the closed position shown in full lines. In the latter position the gate 15 forms a partition across the loading tube and thereby provides an upper loading chamber 17.

About the lower portion of the loading tube 12 extends the manifold 18. The manifold has an upwardly extending conduit 19 which communicates with the upper portion of the chamber 17. Below the manifold 18 the loading zone 12 is of greater diameter than above the manifold. The bottom of the tube 12 is provided with a gasket member 20.

A loading sleeve 21 is mounted on the interior of the tube 12 and extends downwardly therebelow in spaced relation to the lower portion of the tube.

The operating mechanism for the horizontally reciprocable valve plate 14 and the pivoted gate 15 may be of any desired type. As shown, the plate 14 is pivoted at 22 and may be operated in the desired manner by the extension 23. The pivot portion 16 for the gate 15 is provided with a rigidly attached lever 24 which may be actuated by the trip mechanism 25.

Communicating with the manifold 18 is a conduit 26 which leads to a combined valve member 27. The first valve of the member 27 has a stem 28 passing upwardly to a cam roller 29. A cam 30 intermittently moves the cam roller 29 and stem 28 upwardly against the action of the spring 31 by which the valve seat 32 is biased to a closed position in which the conduit 33 is shut off from communication with the conduit 26. The conduit 33 leads to a vacuum tank 34 which is maintained under a suitable vacuum of the order of 29.5 inches of mercury by means of the vacuum pump 35. The tank and pump have sufficiently large capacities to maintain a reasonably uniform pressure in the tank and to dampen out undue pressure fluctuations.

The valve member 27 also has a communication with the conduit 26 which leads to the conduit 36, the latter being in communication with a tank 37 filled with an inert gas such as carbon dioxide under suitable pressure. A valve stem 38 normally is biased toward closed position in which communication between the conduits 36 and 26 is cut off by means of the spring 39 acting upon the valve seat 40. The valve stem 38 is provided with a cam roller 41 which is intermittently depressed downwardly by the action of the cam 42, thereby intermittently establishing communication between the carbon dioxide tank and the conduit 26. It will be seen that the cams 30 and 42 are of such structure and position as to intermittently provide for exhaustion of the loading tube and injection of carbon dioxide therein in proper sequence. The valve seats 32 and 40 are so arranged as to be biased toward closed position by the vacuum and $CO_2$ pressure, respectively. A suitable pressure regulating valve 43 may be provided in the line 36.

In the loading tube mechanism described is provided a loading chuck housing 44 of a shape similar to the shape of the container. It will be understood that the loading tube also has a shape corresponding to the shape of the container.

It will be noted that the chuck 44 is positioned slightly below the thin sleeve 21. In the chuck is mounted a container 45 of the desired construction, size and shape. This container has a somewhat loose fit within the chuck so as to permit it to be freely inserted and withdrawn from the chuck and to provide for the free flow of gases between the container wall and the chuck.

In the packaging of coffee by my improved method the gate 14 is opened and the gate 15 is closed, thereby providing for the receipt by the chamber 17 of the unit quantity of coffee falling through the funnel 11. When this coffee is received in the chamber 17 the valve gate 14 is closed. A container is placed within the chuck 45 and the loading tube is lowered so that the sleeve 21 passes interiorly of the container into the position shown in Fig. 2. In this position the lower end of the tube 21 is adjacent but spaced from the bottom of the container and the walls of the sleeve 21 are in spaced relation to the interior walls of the container. Also, the gasket member 20 engages the top of the chuck 44 to establish an hermetic seal.

When this second step is effected the cam 30 operates upon valve stem 28 and establishes communication between the conduits 33 and 26. This action immediately withdraws gases from the chamber 17 and the coffee stored within it through the conduit 19, manifold 18 and line 26. Furthermore, the lower compartment 46 provided by the second position of the tube 21 and extending from the gate 15 to the bottom of the container 45 also is exhausted of gases by their withdrawal from between the sides of the container and the sleeve 21, as shown by the arrows in Fig. 2. The space on the exterior of the container 45 and within the chuck also is open to the conduit 26 and is exhausted. The conduit 26, the valve 27, the line 33, and the vacuum tank 34 are made adequate to provide for the quick and effective exhaustion of gases from the compartments 17 and 46. In order to maintain this rapid rate of exhaustion it is necessary that the vacuum pump 35 have a relatively large displacement capacity. For the packaging of one-half pound unit containers of coffee at a rate which requires exhaustion in somewhat less than one second, a vacuum pump of a capacity of the order of 750 cubic feet per minute is desirable.

As soon as the interior of the loading mechanism has been exhausted sufficiently to provide a vacuum of the order of 29.5 inches of mercury the gate 15 is tripped and the coffee falls from the compartment 17 into the exhausted compartment 46. Granular substances such as coffee have a tendency to mechanically incorporate air in such a manner as to resist exhaustion by ordinary methods. Possibly, stratified air pockets account for this resistance to exhaustion of air from static coffee. Thus, when the coffee falls from the compartment 17 into the container 45 upon opening of the gate 15, the coffee falls into an exhausted chamber and any stratification of the coffee which may have occurred in compartment 17 is broken up, thereby effecting a further reduction in quantity of air remaining in the coffee.

The valve mechanism is timed so as to continue the exhaustion of gas from chambers 17 and 46 until about the time the freely falling coffee contacts the bottom of the container 45, so that any residual air from the stratified pockets of the coffee can be exhausted. The previous exhaustion of chamber 46 prior to release of gate 15 allows the coffee to drop freely and without gaseous resistance, thereby providing for the compact arrangement of particles within the container.

After this second stage of the operation of the process in which the coffee is dropped from the primary exhaustion chamber into the secondary exhaustion chamber, the cam 42 depresses valve stem 38 to provide for the injection of carbon dioxide through the line 26. It will be understood that prior to the action of the cam 42 the cam 30 will have closed the valve between lines 26 and 33. The injected carbon dioxide passes from the line 26 into manifold 18, upwardly through conduit 19 and into the upper portion of the loading tube, as shown by the arrows in Fig. 4. The carbon dioxide also passes between the interior face of the container and the exterior face of the sleeve 21 to the bottom of compartment 46, then upwardly through the coffee contained therein. Carbon dioxide also will pass downwardly into the coffee from the upper portion of the loading tube, all as indicated by the arrows in Fig. 4, thereby effectively filling the voids between the coffee particles.

During this entire closed operation of the process the gate 14 and the loading tube 12 are pressed downwardly with sufficient force to maintain the hermetic seal between the gate 14 and the loading tube on the one hand and the loading tube and the chuck 44 on the other hand.

It is preferred to inject a sufficient quantity of carbon dioxide into the system as described to provide a slight superatmospheric pressure therewithin. Also, the carbon dioxide entering into the system preferably is heated by any suitable means to a temperature which may be of the order of 100° F. to 200° F. This heating reduces the quantity of carbon dioxide necessary to bring the gas pressure within the mechanism to superatmospheric pressure and further prevent the possibility of the gas causing a freezing action by the cooling effect of its expansion.

The packing of the coffee may be materially assisted by providing a vibrating action during and after the dumping of the coffee from the compartment 17 into the chamber 46.

After a sufficient quantity of carbon dioxide has been injected through the line 26 to provide a slight superatmospheric pressure within the loading mechanism the valve between lines 26 and 36 again is closed and the loading tube 12 is raised back to the position shown in Fig. 1, where it is ready for another cycle of operation. Before dumping another unit of coffee from the funnel 11 into the compartment 17, the gate 15 again is closed and the valve gate 14 is opened.

After the loading tube is raised out of the chuck 44 and the container, the latter may be closed hermetically in any suitable manner. Where a rigid container such as tin or glass is employed a suitable air-tight closure is placed in position and the container is sealed. If a flexible container such as a laminated paper and transparent rubber hydrochloride bag is employed, the top of the bag is heat-sealed. The container and coffee are removed from the chuck, which then is ready for a subsequent operation.

A feature of the process is that a substantial quantity of a residual $CO_2$ is allowed to remain in the loading mechanism after the loading operation is complete. For instance, the injection of $CO_2$ into the coffee fills the upper container 17 with this gas and closure of the gate 15 prevents flow of gas through the loading tube. As the loading tube is moved upwardly to its next filling operation the $CO_2$ remains in compartment 17, so that when coffee is dumped into the chamber 17 a substantial portion of the occluded oxygen in the coffee is displaced by the $CO_2$. That is, the $CO_2$ is a heavier gas than the oxygen and a large percentage of the oxygen surrounding the coffee is removed in this initial operation. Then, when the subsequent exhaustion step is effected the gas which is removed is largely $CO_2$. The very small amount of gas remaining after the exhaustion again is largely $CO_2$, so that the process is highly efficient in removal of oxygen. As the lower portion of the loading tube also contains residual $CO_2$, evacuation of this compartment prior to the dumping of the coffee will remove a greater percentage of oxygen than would be the case if the loading tube were completely filled with air before the evacuation.

The dumping of the coffee from the primary chamber to the secondary chamber while the latter is under the influence of a vacuum is a further effective step in removing occluded oxygen from the coffee. The relation of the various steps is such that they may be operated together at a rapid rate to provide for the packaging of a large number of units in minimum time as well as in the effective packaging of the commodity from the standpoint of preservation.

It will be recognized that changes may be made in the apparatus and process described herein for purposes of explanation without departing from the scope of the appended claims.

I claim:

1. The process of packaging granular materials, which comprises dumping a unit quantity of said materials into a primary zone containing residual quantities of an inert gas, simultaneously evacuating said primary zone and a secondary zone adjacent said primary zone, providing a container in said secondary zone, dumping the material from the primary zone into the container in the secondary zone, and injecting an inert gas into the materials in said secondary zone.

2. The process for packaging a granular material, which comprises dumping a unit quantity of said material into the upper of two adjacent zones, simultaneously evacuating said zones, dumping said material into the lower of said zones and simultaneously injecting an inert gas into said lower and said upper zones into the material in said lower zones.

3. The method of packing coffee, which comprises dumping a quantity of the coffee into the upper of two adjacent loading zones, providing a container in the lower of said zones, simultaneously evacuating said zones, dropping said coffee from said upper to said lower zone, simultaneously injecting carbon dioxide into the coffee in said lower zone and said upper zone, and sealing said container.

4. The process of packaging coffee, which comprises dumping a quantity of coffee into the upper of two loading zones, providing a container in the lower of said zones, simultaneously evacuating said zones, dumping the coffee from the first of said zones into said container provided in the second of said zones during the evacuation, injecting carbon dioxide into both of said zones while said coffee is in said lower zone, sealing said container, and dumping additional coffee in said upper zone in the presence of said $CO_2$.

5. In the packaging of granular materials, the steps which comprise placing a quantity of said materials in the upper of two superimposed loading zones, providing a container in the lower of said loading zones, simultaneously evacuating said zones, and dumping said material from the upper of said zones into the lower of said zones and injecting carbon dioxide into the material in the lower of said zones.

6. In a process of packaging granular materials, the combination of steps which comprises dumping a quantity of said materials into a container loading zone containing residual inert gas and having a container for receipt of said material, evacuating said loading zone, container and material, and injecting an inert gas into said zone and both upwardly and downwardly in said container and through said material.

7. In a process of packing granular materials, the combination of steps which comprises placing a quantity of said materials in a container loading zone provided with a container therefor, evacuating said zone, said container, and said material, injecting an inert gas into said zone, and both upwardly and downwardly in said container, and said material, removing said container, placing an additional container in said zone, and placing an additional quantity of said material in said zone while containing residual quantities of said inert gas.

8. In a process of packaging coffee, the improved combination of steps which comprises pouring the granular coffee into an evacuated loading zone and into a container provided for receiving said coffee, continuing the evacuation of said zone during at least a portion of the pouring operation, and injecting an inert gas into said zone, said container, and said materials.

GEORGE ARLINGTON MOORE.

CERTIFICATE OF CORRECTION.

Patent No. 2,335,192.                                           November 23, 1943.

GEORGE ARLINGTON MOORE.

It is hereby certified that error appears in the printed specification of the above numbered patent requiring correction as follows: Page 1, second column, line 31, for "packaging" read --packing--; page 3, second column, line 57, claim 2, for "zones" read --zone--; and that the said Letters Patent should be read with this correction therein that the same may conform to the record of the case in the Patent Office.

Signed and sealed this 29th day of February, A. D. 1944.

Leslie Frazer (Seal)                                             Acting Commissioner of Patents.